(12) United States Patent
Chen et al.

(10) Patent No.: US 10,050,810 B2
(45) Date of Patent: Aug. 14, 2018

(54) CHANNEL ESTIMATION METHOD, APPARATUS AND SYSTEM

(71) Applicant: Huawei Technologies Co., Ltd., Shenzhen (CN)

(72) Inventors: Teyan Chen, Shenzhen (CN); Hong Cheng, Shenzhen (CN); Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 65 days.

(21) Appl. No.: 15/130,652

(22) Filed: Apr. 15, 2016

(65) Prior Publication Data

US 2016/0234041 A1 Aug. 11, 2016

Related U.S. Application Data

(63) Continuation of application No. PCT/CN2013/085359, filed on Oct. 17, 2013.

(51) Int. Cl.
| | |
|---|---|
| *H04L 25/02* | (2006.01) |
| *H04L 5/00* | (2006.01) |
| *H04L 5/14* | (2006.01) |
| *H04W 24/02* | (2009.01) |
| *H04W 28/02* | (2009.01) |

(52) U.S. Cl.
CPC .......... *H04L 25/0202* (2013.01); *H04L 5/005* (2013.01); *H04L 5/0073* (2013.01); *H04L 5/14* (2013.01); *H04W 24/02* (2013.01); *H04W 28/0273* (2013.01)

(58) Field of Classification Search
CPC ......... H04L 5/00; H04L 5/005; H04L 5/0073; H04L 5/14; H04L 25/02; H04L 25/0202; H04L 1/00; H04W 24/02; H04W 28/0273
See application file for complete search history.

(56) References Cited

U.S. PATENT DOCUMENTS 9,338,673 B2 * 5/2016 Cheng ................... H04W 24/02
9,516,545 B2 * 12/2016 Cheng .................. H04B 7/0689
(Continued)

FOREIGN PATENT DOCUMENTS

| CN | 101409923 A | 4/2009 |
|---|---|---|
| CN | 101674282 A | 3/2010 |

(Continued)

*Primary Examiner* — Tri H Phan
(74) *Attorney, Agent, or Firm* — Leydig, Voit & Mayer, Ltd.

(57) ABSTRACT

A channel estimation method includes: obtaining a self-interference channel estimation value of an ith moment and a communication channel estimation value of the ith moment, the i being greater than or equal to 0; obtaining a local end transmitting signal of the ith moment; obtaining an opposite end transmitting signal estimation value of the ith moment; and according to the self-interference channel estimation value of the ith moment, the communication channel estimation value of the ith moment, the local end transmitting signal of the ith moment and the opposite end transmitting signal estimation value of the ith moment, obtaining the self-interference channel estimation value and communication channel estimation value of an i+1 moment, and the i+1 moment differing from the i moment by 1 unit of time.

8 Claims, 6 Drawing Sheets

(56) References Cited

U.S. PATENT DOCUMENTS

| | | | |
|---|---|---|---|
| 9,532,244 B2* | 12/2016 | Wu | H04L 25/0224 |
| 2011/0143655 A1* | 6/2011 | Ahn | H04B 7/15542 |
| | | | 455/9 |
| 2014/0133411 A1* | 5/2014 | Park | H04L 5/0058 |
| | | | 370/329 |
| 2014/0286185 A1 | 9/2014 | Liu et al. | |
| 2015/0071062 A1* | 3/2015 | Cheng | H04B 7/0689 |
| | | | 370/230 |
| 2015/0180681 A1* | 6/2015 | Aggarwal | H04L 25/03 |
| | | | 375/267 |
| 2016/0226653 A1* | 8/2016 | Bharadia | H04B 1/525 |
| 2016/0277166 A1* | 9/2016 | Liu | H04L 25/03006 |
| 2017/0104506 A1* | 4/2017 | Liu | H04B 1/1027 |
| 2017/0187513 A9* | 6/2017 | Bharadia | H04L 5/1461 |
| 2017/0257180 A1* | 9/2017 | Aggarwal | H04L 25/03 |
| 2017/0339569 A1* | 11/2017 | Khandani | H04W 12/04 |

FOREIGN PATENT DOCUMENTS

| | | |
|---|---|---|
| CN | 102281129 A | 12/2011 |
| CN | 102404258 A | 4/2012 |
| CN | 103200140 A | 7/2013 |
| CN | 103338172 A | 10/2013 |
| WO | WO 2006068748 A2 | 6/2006 |

\* cited by examiner

CHANNEL ESTIMATION METHOD, APPARATUS AND SYSTEM

CROSS-REFERENCE TO RELATED APPLICATIONS

This application is a continuation of International Patent Application No. PCT/CN2013/085359, filed on Oct. 17, 2013, which is hereby incorporated by reference in its entirety.

FIELD

The present application relates to the field of communications, and in particular to a method, apparatus and system for channel estimation.

BACKGROUND

In wireless full-duplex technology, signals may be received and transmitted on the same wireless channel at the same time. Spectral efficiency of the wireless full-duplex technology is the double of spectral efficiency of FDD (Frequency Division Duplex) technology or TDD (Time Division Duplex) technology. In an implementation of the wireless full-duplex technology, interference of a local-end transmission signal, which is received by a first transceiver from its own transmitting end, to an opposite-end transmission signal, which is received by the first transceiver from a second transceiver, needs to be eliminated as much as possible, such than the first transceiver may receives the opposite-end transmission signal from the second transceiver correctly. The opposite-end transmission signal is transmitted from the second transceiver to the first transceiver, which is a useful signal to be obtained. The local-end transmission signal is a signal transmitted from the transmitting end of the first transceiver. The received signal of the first transceiver includes a local-end transmission signal and an opposite-end transmission signal, both of which are received by the first transceiver. The first transceiver includes a first transmitter and a first receiver; and the second transceiver includes a second transmitter and a second receiver.

In the conventional technology, the self-interference may be eliminated as much as possible using technologies such as spatial interference suppression, analog interference cancellation and digital interference cancellation in the wireless full-duplex system, where the self-interference is interference of the local-end transmission signal received by the first transceiver to the opposite-end transmission signal in the received signal of the first transceiver. The analog interference cancellation technology mainly involves eliminating an interference signal of a received analog signal which is transmitted through a main path of the self-interference. The digital interference cancellation technology is a supplement to the analog interference cancellation technology. After the received analog signal of the first transceiver is converted to a received digital signal by an analog-to-digital converter, a self-interference signal may still be present in the received digital signal. The self-interference signal mainly includes a multi-path interference signal generated by reflecting the local-end transmission signal by surrounding objects. The digital interference cancellation technology involves eliminating residual self-interference signals in the received digital signal at the baseband to obtain correct and useful signals. Thus, a self-interference channel on which the self-interference signal is generated needs to be accurately estimated, so as to accurately obtain an estimation value of the self-interference channel to implement the digital interference cancellation.

In the conventional technology, in general, a first pilot signal is inserted into the local-end transmission signal transmitted from the first transceiver to the first transceiver, a second pilot signal is inserted into the opposite-end transmission signal transmitted from the second transceiver to the first transceiver. The first transceiver obtains a received first pilot signal and a received second pilot signal and performs a self-interference channel estimation based on the received first pilot signal and a known first pilot signal. The first transceiver performs a communication channel estimation based on the received second pilot signal and a known second pilot. In this way, variations of the self-interference channel and a communication channel are tracked, to obtain the correct opposite-end transmission signal. The first transceiver and the second transceiver transmit the pilot signals very frequently and significant communication resources are occupied, and thus the utilization rate of the communication resources is low.

SUMMARY

A method, apparatus and system for channel estimation is provided according to embodiments of the present application, so as to improve the utilization rate of the communication resources.

To achieve the above object, technical solutions are provided according to the embodiments of the present application as follows.

In a first aspect, a method for channel estimation is provided. The method is applied to a first transceiver, which includes:

obtaining an estimation value of a self-interference channel at an i-th instant and an estimation value of a communication channel at the i-th instant, where the i is larger than or equal to 0;

obtaining a local-end transmission signal at the i-th instant;

obtaining an estimation value of an opposite-end transmission signal at the i-th instant; and obtaining an estimation value of the self-interference channel at an (i+1)-th instant and an estimation value of the communication channel at the (i+1)-th instant, based on the estimation value of the self-interference channel at the i-th instant, the estimation value of the communication channel at the i-th instant, the local-end transmission signal at the i-th instant and the estimation value of the opposite-end transmission signal at the i-th instant, where the (i+1)-th instant differs from the i-th instant by one unit of time.

In conjunction with the first aspect, in a first implementation, the obtaining an estimation value of an opposite-end transmission signal at the i-th instant includes:

obtaining a received signal at the i-th instant;

obtaining a self-interference signal at the i-th instant based on the estimation value of the self-interference channel at the i-th instant, where the self-interference signal at the i-th instant is an estimation value of a local-end transmission signal received by the first transceiver at the i-th instant;

performing a digital interference cancellation on the received signal at the i-th instant based on the self-interference signal at the i-th instant, to obtain an estimation value of a received opposite-end transmission signal at the i-th instant; and obtaining the estimation value of the opposite-end transmission signal at the i-th instant based on the estimation value of the received opposite-end transmission signal at i-th instant and the estimation value of the communication channel at the i-th instant.

In conjunction with the first aspect or the first implementation, in a second implementation, in a case that the i is equal to 0, before obtaining an estimation value of a self-interference channel at an i-th instant and an estimation value of a communication channel at the i-th instant, the method further includes:

receiving a first pilot signal transmitted by the first transceiver;

obtaining the estimation value of the self-interference channel at the i-th instant based on the first pilot signal;

receiving a second pilot signal transmitted by a second transceiver; and obtaining the estimation value of the communication channel at the i-th instant based on the second pilot signal.

In conjunction with the first aspect, the first implementation or the second implementation, in a third implementation, the obtaining an estimation value of the self-interference channel at an (i+1)-th instant and an estimation value of the communication channel at the (i+1)-th instant, based on the estimation value of the self-interference channel at the i-th instant, the estimation value of the communication channel at the i-th instant, the local-end transmission signal at the i-th instant and the estimation value of the opposite-end transmission signal at the i-th instant includes:

obtaining the estimation value of the self-interference channel at the (i+1)-th instant with a first channel estimation formula, based on the estimation value of the self-interference channel at the i-th instant, the local-end transmission signal at the i-th instant, the estimation value of the communication channel at the i-th instant and the estimation value of the opposite-end transmission signal at the i-th instant; and obtaining the estimation value of the communication channel at the (i+1)-th instant with a second channel estimation formula, based on the estimation value of the communication channel at the i-th instant, the estimation value of the opposite-end transmission signal at the i-th instant, the estimation value of the self-interference channel at the i-th instant and the local-end transmission signal at the i-th instant, where the first channel estimation formula is $\hat{h}_n(i+1)=\hat{h}_n(i)+\mu_n x_n(i)e^*(i)$, the second channel estimation formula is $\hat{h}_s(i+1)=\hat{h}_s(i)+\mu_s \hat{s}(i)e^*(i)$, where the $\mu_n$ is a step parameter of the first channel estimation formula, the $\mu_s$ is a step parameter of the second channel estimation formula, the $e^*(i)$ is a conjugate transpose of a difference $e(i)$ between the received signal and a sum of the self-interference signal at the i-th instant and the estimation value of the received opposite-end transmission signal at the i-th instant, the $x_n(i)$ is the local-end transmission signal at the i-th instant, the $\hat{s}(i)$ is the estimation value of the opposite-end transmission signal at the i-th instant, the $\hat{h}_n(i)$ is the estimation value of the self-interference channel at the i-th instant, the $\hat{h}_s(i)$ is the estimation value of the communication channel at the i-th instant, the $\hat{h}_n(i+1)$ is the estimation value of the self-interference channel at the (i+1)-th instant, and the $\hat{h}_s(i+1)$ is the estimation value of the communication channel at the (i+1)-th instant.

In a second aspect, a transceiver is provided, which includes:

a first obtaining unit configured to obtain an estimation value of a self-interference channel at an i-th instant and an estimation value of a communication channel at the i-th instant, where the i is larger than or equal to 0;

a second obtaining unit configured to obtain a local-end transmission signal at the i-th instant;

a third obtaining unit configured to obtain an estimation value of an opposite-end transmission signal at the i-th instant; and a fourth obtaining unit configured to obtain an estimation value of the self-interference channel at an (i+1)-th instant and an estimation value of the communication channel at the (i+1)-th instant, based on the estimation value of the self-interference channel at the i-th instant, the estimation value of the communication channel at the i-th instant, the local-end transmission signal at the i-th instant and the estimation value of the opposite-end transmission signal at the i-th instant, where the (i+1)-th instant differs from the i-th instant by one unit of time.

In conjunction with the second aspect, in a first implementation, the third obtaining unit is configured to:

obtain a received signal at the i-th instant;

obtain a self-interference signal at the i-th instant based on the estimation value of the self-interference channel at the i-th instant, where the self-interference signal at the i-th instant is an estimation value of a local-end transmission signal received by the transceiver at the i-th instant;

perform a digital interference cancellation on the received signal at the i-th instant based on the self-interference signal at the i-th instant, to obtain an estimation value of a received opposite-end transmission signal at the i-th instant; and obtain the estimation value of the opposite-end transmission signal at the i-th instant based on the estimation value of the received opposite-end transmission signal at the i-th instant and the estimation value of the communication channel at the i-th instant.

In conjunction with the second aspect or the first implementation, in a second implementation, in a case that the i is equal to 0, the transceiver further includes:

a first receiving unit configured to receive a first pilot signal transmitted by the transceiver;

a fifth obtaining unit configured to obtain the estimation value of the self-interference channel at the i-th instant based on the first pilot signal;

a second receiving unit configured to receive a second pilot signal transmitted by the transceiver; and a sixth obtaining unit configured to obtain the estimation value of the communication channel at the i-th instant based on the second pilot signal.

In conjunction with the second aspect, the first implementation or the second implementation, in a third implementation, the fourth obtaining unit is configured to:

obtain the estimation value of the self-interference channel at the (i+1)-th instant with a first channel estimation formula, based on the estimation value of the self-interference channel at the i-th instant, the local-end transmission signal at the i-th instant, the estimation value of the communication channel at the i-th instant and the estimation value of the opposite-end transmission signal at the i-th instant; and obtain the estimation value of the communication channel at the (i+1)-th instant with a second channel estimation formula, based on the estimation value of the communication channel at the i-th instant, the estimation value of the opposite-end transmission signal at the i-th instant, the estimation value of the self-interference channel at the i-th instant and the local-end transmission signal at the i-th instant, where the first channel estimation formula is $$\hat{h}_n(i+1)=\hat{h}_n(i)+\mu_n x_n(i)e^*(i),$$

the second channel estimation formula is $$\hat{h}_s(i+1)=\hat{h}_s(i)+\mu_s \hat{s}(i)e^*(i),$$

where the $\mu_n$ is a step parameter of the first channel estimation formula, the $\mu_s$ is a step parameter of the second channel estimation formula, the $e^*(i)$ is a conjugate transpose of a difference $e(i)$ between the received signal and a sum of the self-interference signal at the i-th instant and the estimation value of the received opposite-end transmission signal at the i-th instant, the $x_n(i)$ is the local-end transmission signal at the i-th instant, the $\hat{s}(i)$ is the estimation value of the opposite-end transmission signal at the i-th instant, the $\hat{h}_n(i)$ is the estimation value of the self-interference channel at the i-th instant, the $\hat{h}_s(i)$ is the estimation value of the communication channel at the i-th instant, the $\hat{h}_n(i+1)$ is the estimation value of the self-interference channel at the (i+1)-th instant, and the $\hat{h}_s(i+1)$ is the estimation value of the communication channel at the (i+1)-th instant.

In a third aspect, a system for channel estimation is provided, which includes at least two transceivers, where each of the at least two transceivers is any one of the transceivers described above, the transceivers are configured to obtain an estimation value of a self-interference channel at an i-th instant and an estimation value of a communication channel at the i-th instant, where the i is larger than or equal to 0; obtain a local-end transmission signal at the i-th instant; obtain an estimation value of an opposite-end transmission signal at the i-th instant; and obtain an estimation value of the self-interference channel at an (i+1)-th instant and an estimation value of the communication channel at the (i+1)-th instant, based on the estimation value of the self-interference channel at the i-th instant, the estimation value of the communication channel at the i-th instant, the local-end transmission signal at the i-th instant and the estimation value of the opposite-end transmission signal at the i-th instant, where the (i+1)-th instant differs from the i-th instant by one unit of time.

In a fourth aspect, a transceiver for channel estimation is provided, which includes:

a processor configured to obtain an estimation value of a self-interference channel at an i-th instant and an estimation value of a communication channel at the i-th instant, where the i is larger than or equal to 0;

obtain a local-end transmission signal at the i-th instant;

obtain an estimation value of an opposite-end transmission signal at the i-th instant; and obtain an estimation value of the self-interference channel at an (i+1)-th instant and an estimation value of the communication channel at the (i+1)-th instant, based on the estimation value of the self-interference channel at the i-th instant, the estimation value of the communication channel at the i-th instant, the local-end transmission signal at the i-th instant and the estimation value of the opposite-end transmission signal at the i-th instant, where the (i+1)-th instant differs from the i-th instant by one unit of time.

In conjunction with the fourth aspect, in a first implementation, the processor is configured to:

obtain a received signal at the i-th instant;

obtain a self-interference signal at the i-th instant based on the estimation value of the self-interference channel at the i-th instant, where the self-interference signal at the i-th instant is an estimation value of a local-end transmission signal received by the transceiver at the i-th instant;

perform a digital interference cancellation on the received signal at the i-th instant based on the self-interference signal at the i-th instant, to obtain an estimation value of a received opposite-end transmission signal at the i-th instant; and obtain the estimation value of the opposite-end transmission signal at the i-th instant based on the estimation value of the received opposite-end transmission signal at the i-th instant and the estimation value of the communication channel of the i-th instant.

In conjunction with the fourth aspect or the first implementation, in a second implementation, in a case that the i is equal to 0, the transceiver further includes a receiver configured to receive a first pilot signal transmitted by the transceiver, the processor is further configured to obtain the estimation value of the self-interference channel at the i-th instant based on the first pilot signal;

the receiver is further configured to receive a second pilot signal transmitted by the transceiver; and the processor is further configured to obtain the estimation value of the communication channel at the i-th instant based on the second pilot signal.

In conjunction with the fourth aspect, the first implementation and the second implementation, in a third implementation, the processor is configured to:

obtain the estimation value of the self-interference channel at the (i+1)-th instant with a first channel estimation formula, based on the estimation value of the self-interference channel at the i-th instant, the local-end transmission signal at the i-th instant, the estimation value of the communication channel at the i-th instant and the estimation value of the opposite-end transmission signal at the i-th instant; and obtain the estimation value of the communication channel at the (i+1)-th instant with a second channel estimation formula, based on the estimation value of the communication channel at the i-th instant, the estimation value of the opposite-end transmission signal at the i-th instant, the estimation value of the self-interference channel at the i-th instant and the local-end transmission signal at the i-th instant, where the first channel estimation formula is $$\hat{h}_n(i+1)=\hat{h}_n(i)+\mu_n x_n(i)e^*(i),$$

the second channel estimation formula is $$\hat{h}_s(i+1)=\hat{h}_s(i)+\mu_s \hat{s}(i)e^*(i),$$

where the $\mu_n$ is a step parameter of the first channel estimation formula, the $\mu_s$ is a step parameter of the second channel estimation formula, the $e^*(i)$ is a conjugate transpose of a difference $e(i)$ between the received signal and a sum of the self-interference signal at the i-th instant and the estimation value of the received opposite-end transmission signal at the i-th instant, the $x_n(i)$ is the local-end transmission signal at the i-th instant, the $\hat{s}(i)$ is the estimation value of the opposite-end transmission signal at the i-th instant, the $\hat{h}_n(i)$ is the estimation value of the self-interference channel at the i-th instant, the $\hat{h}_s(i)$ is the estimation value of the communication channel at the i-th instant, the $\hat{h}_n(i+1)$ is the estimation value of the self-interference channel at the (i+1)-th instant, and the $\hat{h}_s(i+1)$ is the estimation value of the communication channel at the (i+1)-th instant.

In a fifth aspect, a system for channel estimation is provided, which includes at least two transceivers, where each of the at least two transceivers is any one of the transceivers described above, the transceivers are configured to obtain an estimation value of a self-interference channel at an i-th instant and an estimation value of a communication channel at the i-th instant, where the i is larger than or equal to 0; obtain a local-end transmission signal at the i-th instant; obtain an estimation value of an opposite-end transmission signal at the i-th instant; and obtain an estimation value of the self-interference channel at an (i+1)-th instant and an estimation value of the communication channel at the (i+1)-th instant, based on the estimation value of the self-interference channel at the i-th instant, the estimation value of the communication channel at the i-th instant, the local-end transmission signal at the i-th instant and the estimation value of the opposite-end transmission signal at the i-th instant, where the (i+1)-th instant differs from the i-th instant by one unit of time.

A method, apparatus and system for channel estimation is provided according to the embodiments of the present application, and the method for channel estimation includes: obtaining an estimation value of a self-interference channel at an i-th instant and an estimation value of a communication channel at the i-th instant, where the i is larger than or equal to 0; obtaining a local-end transmission signal at the i-th instant; obtaining an estimation value of an opposite-end transmission signal at the i-th instant; and obtaining an estimation value of the self-interference channel at an (i+1)-th instant and an estimation value of the communication channel at the (i+1)-th instant, based on the estimation value of the self-interference channel at the i-th instant, the estimation value of the communication channel at the i-th instant, the local-end transmission signal at the i-th instant and the estimation value of the opposite-end transmission signal at the i-th instant, where the (i+1)-th instant differs from the i-th instant by one unit of time. In this way, the estimation value of the self-interference channel at the (i+1)-th instant and the estimation value of the communication channel at the (i+1)-th instant are obtained by obtaining the estimation value of the self-interference channel at the i-th instant, the estimation value of the communication channel at the i-th instant, the local-end transmission signal at the i-th instant and the estimation value of the opposite-end transmission signal at the i-th instant. Compared with a case that the transceivers estimate the self-interference channel and the communication channel by frequently transmitting the pilot signals in the conventional technology, the utilization rate of the communication resources is effectively improved.

BRIEF DESCRIPTION OF THE DRAWINGS

In order to more clearly illustrate technical solutions in embodiments of the present application or in the conventional technology, drawings used in the description of the embodiments or the conventional technology are introduced briefly hereinafter. Apparently, the drawings described in the following illustrates some embodiments of the present application, other drawings may be obtained by those ordinarily skilled in the art based on these drawings without any creative efforts.

DETAILED DESCRIPTION OF EMBODIMENTS

The technical solutions in embodiments of the present application are clearly and completely described hereinafter in conjunction with the drawings in the embodiments of the present application. Apparently, the described embodiments are only a few of the embodiments of the present application. Based on the embodiments of the present application, all other embodiments obtained by those ordinarily skilled in the art without any creative efforts fall within the protection scope of the present application.

Figure 1:
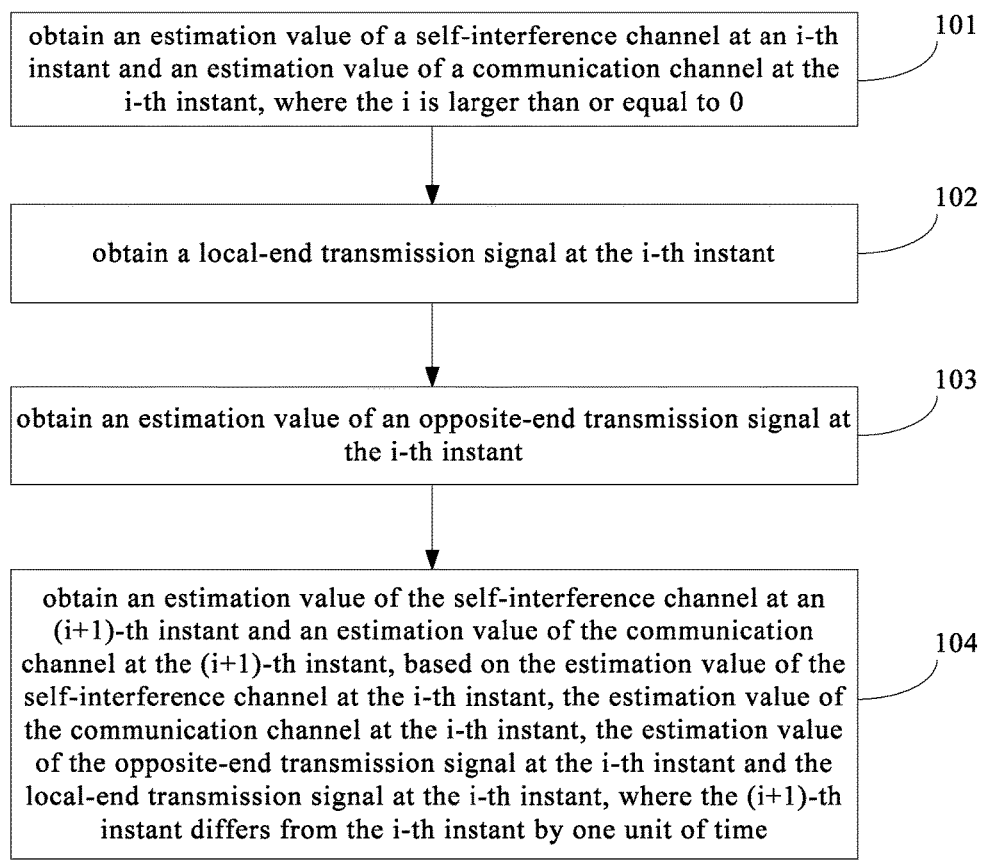
FIG. 1 is a flow chart of a method for channel estimation according to an embodiment of the present.

A method for channel estimation is provided according to an embodiment of the present application. The method is applied to a first transceiver. In this embodiment, it is assumed that the first transceiver is a local-end transceiver, the second transceiver is an opposite-end transceiver, the first transceiver includes a first transmitter and a first receiver, the second transceiver includes a second transmitter and a second receiver. As shown in FIG. 1, the method includes the follows.

In step S101, an estimation value of a self-interference channel at an i-th instant and an estimation value of a communication channel at the i-th instant are obtained, where the i is larger than or equal to 0.

A first pilot signal is transmitted from the first transceiver to the first transceiver, and a second pilot signal is transmitted from the second transceiver to the first transceiver. The first transceiver obtains a received first pilot signal and a received second pilot signal. Specifically, the first pilot signal and the second pilot signal are preset signals, and the first transceiver knows the first pilot signal and the second pilot signal. The first transceiver estimates a self-interference channel based on the received first pilot signal and the known first pilot signal, to obtain an estimation value of the self-interference channel. The received first pilot signal is a first pilot signal transmitted through the self-interference channel. The first transceiver estimates a communication channel based on the received second pilot signal and the known second pilot signal, to obtain an estimation value of the communication channel. The received second pilot signal is a second pilot signal transmitted through the communication channel.

Generally, the first pilot signal may be inserted into a time domain of a local-end transmission signal, a frequency domain of the local-end transmission signal, or both the time domain and the frequency domain of the local-end transmission signal at a uniform interval, before the local-end transmission signal is transmitted from the first transceiver to the first transceiver. A block-type pilot is formed by inserting the first pilot signal into the time domain of the local-end transmission signal. A comb-type pilot is formed by inserting the first pilot signal into the frequency domain of the local-end transmission signal. A scattered pilot is formed by inserting the first pilot signal into both the time domain and the frequency domain of the local-end transmission signal at the uniform interval. Similarly, the second pilot signal may be inserted into a time domain of an opposite-end transmission signal, a frequency domain of the opposite-end transmission signal, or both the time domain and the frequency domain of the opposite-end transmission signal at a uniform interval, before the opposite-end transmission signal is transmitted from the second transceiver to the first transceiver. A block-type pilot is formed by inserting the second pilot signal into the time domain of the opposite-end transmission signal. A comb-type pilot is formed by inserting the second pilot signal into the frequency domain of the opposite-end transmission signal. A scattered pilot is formed by inserting the second pilot signal into both the time domain and the frequency domain of the opposite-end transmission signal at the uniform interval.

Illustratively, the first transceiver may insert the first pilot signal into the time domain of the local-end transmission signal; obtains the received first pilot signal; and then estimates the self-interference channel with a minimum mean square error method based on the received first pilot signal and the first pilot signal known by the first transceiver, to obtain the estimation value $\hat{h}_n(i)$ of the self-interference channel at the i-th instant. The second transceiver may insert the second pilot signal into the time domain of the opposite-end transmission signal. The first transceiver obtains the received second pilot signal; and then estimates the communication channel with the minimum mean square error algorithm based on the received second pilot signal and the second pilot signal known by the first transceiver, to obtain the estimation value $\hat{h}_s(i)$ of the communication channel at the i-th instant. It should be noted that the i-th instant is an instant at which a signal is transmitted or received, which may be in units of seconds (s), milliseconds (ms) and so on. Alternatively, the i-th instant is an instant at which a signal frame is transmitted or received. In a process of inserting the first pilot signal into the time domain of the local-end transmission signal and inserting the second pilot signal into the time domain of the opposite-end transmission signal, the first pilot signal and the second pilot signal are inserted at a preset time interval, where the preset time interval is one unit of time such as 1 s, 1 ms or one signal frame, and the i is larger than or equal to 0. The least mean square criterion is that a square of a difference between a pilot signal transmitted through a channel and a known pilot signal is minimized.

In step S102, the local-end transmission signal at the i-th instant is obtained.

Illustratively, the local-end transmission signal $x_n(i)$ is transmitted from the first transceiver to the first transceiver. The first transmitter and the first receiver are located inside the same transceiver, thus the local-end transmission signal at the i-th instant $x_n(i)$ is a known signal for the first receiver of the first transceiver. In practical applications, the local-end transmission signal is used to estimate the self-inference channel.

In step S103, an estimation value of the opposite-end transmission signal at the i-th instant is obtained.

The first transceiver receives a received signal including a received local-end transmission signal and a received opposite-end transmission signal. The received local-end transmission signal is a local-end transmission signal transmitted through the self-interference channel. The received opposite-end transmission signal is an opposite-end transmission signal transmitted through the communication channel. A digital interference cancellation is performed on the received signal by using the estimation value of the self-interference channel as an initial value of the self-interference channel, obtaining the received local-end transmission signal based on the estimation value of the self-interference channel and the local-end transmission signal, performing the digital interference cancellation to obtain the received opposite-end transmission signal. The estimation value of the communication channel is used as an initial value of the communication channel, and an estimation value of the opposite-end transmission signal is obtained based on the received opposite-end transmission signal and the estimation value of the communication channel.

Illustratively, when the first transceiver receives the received signal y(i) at the i-th instant, the estimation value $\hat{h}_n(i)$ of the self-interference channel at the i-th instant is used as the initial value $\hat{h}_n(0)$ of the self-interference channel. A self-interference signal $\hat{y}_n(i)$ at the i-th instant is obtained by multiplying the estimation value $\hat{h}_n(i)$ of the self-interference channel at the i-th instant by the local-end transmission signal $x_n(i)$ transmitted from the first transceiver to the first transceiver. The self-interference signal $\hat{y}_n(i)$ is an estimation value of a local-end transmission signal received by the first transceiver at the i-th instant. The local-end transmission signal $x_n(i)$ transmitted from the first transceiver to the first transceiver is a known signal. Then, a digital interference cancellation is performed on the received signal y(i) at the i-th instant based on the self-interference signal $\hat{y}_n(i)$ at the i-th instant, by subtracting the self-interference signal $\hat{y}_n(i)$ at the i-th instant from the received signal y(i) at the i-th instant to obtain an estimation value $\hat{y}_s(i)$ of a received opposite-end transmission signal at the i-th instant. Finally, the estimation value $\hat{h}_s(i)$ of the communication channel is used as the initial value $\hat{h}_s(0)$ of the communication channel, and the estimation value of the opposite-end transmission signal at the i-th instant $\hat{s}(i)$ is obtained based on the estimation value $\hat{y}_s(i)$ of the received opposite-end transmission signal at the i-th instant and the estimation value $\hat{h}_s(i)$ of the communication channel at the i-th instant.

In step S104, an estimation value of the self-interference channel at an (i+1)-th instant and an estimation value of the communication channel at the (i+1)-th instant are obtained, based on the estimation value of the self-interference channel at the i-th instant, the estimation value of the communication channel at the i-th instant, the estimation value of the opposite-end transmission signal at the i-th instant and the local-end transmission signal at the i-th instant, where the (i+1)-th instant differs from the i-th instant by one unit of time.

Illustratively, the first transceiver obtains the estimation value $\hat{h}_n(i)$ of the self-interference channel using the first pilot signal, and obtains the estimation value of the communication channel $\hat{h}_s(i)$ using the second pilot signal. The first transceiver receives the received signal y(i) including the received local-end transmission signal $y_n(i)$ and the received opposite-end transmission signal $y_s(1)$. The received local-end transmission signal $y_n(i)$ is the local-end transmission signal $x_n(i)$ transmitted through the self-interference channel. The received opposite-end transmission signal $y_s(i)$ is the opposite-end transmission signal s(i) transmitted through the communication channel. The digital interference cancellation is performed on the received signal y(i). That is, the estimation value $\hat{h}_n(i)$ of the self-interference channel $\hat{h}_n(i)$ is used as the initial value $\hat{h}_n(0)$ of the self-interference channel, the self-interference signal at the i-th instant is obtained based on the estimation value $\hat{h}_n(i)$ of the self-interference channel and the local-end transmission signal $x_n(i)$, where the self-interference signal of the i-th instant is the estimation value $\hat{y}_n(i)$ of the local-end transmission signal received by the first transceiver at the i-th instant. The digital interference cancellation is performed to obtain the estimation value $\hat{y}_s(i)$ of the received opposite-end transmission signal. The estimation value $\hat{h}_s(i)$ of the communication channel is used as the initial value $\hat{h}_s(0)$ of the communication channel. The estimation value $\hat{s}(i)$ of the opposite-end transmission signal is obtained based on the estimation value $\hat{y}_s(i)$ of the received opposite-end transmission signal and the estimation value $\hat{h}_s(i)$ of the communication channel.

The estimation value $\hat{h}_n(i+1)$ of the self-interference channel at the (i+1)-th instant is obtained with a first channel estimation formula, based on the estimation value $\hat{h}_n(i)$ of the self-interference channel at the i-th instant, the local-end transmission signal $x_n(i)$ at the i-th instant, the estimation value $\hat{h}_s(i)$ of the communication channel at the i-th instant and the estimation value $\hat{s}(i)$ of the opposite-end transmission signal at the i-th instant.

The estimation value $\hat{h}_s(i+1)$ of the communication channel at the (i+1)-th instant is obtained with a second channel estimation formula, based on the estimation value $\hat{h}_s(i)$ of the communication channel at the i-th instant, the estimation value $\hat{s}(i)$ of the opposite-end transmission signal at the i-th instant, the estimation value $\hat{h}_n(i)$ of the self-interference channel at the i-th instant and the local-end transmission signal $x_n(i)$ of the i-th instant.

The first channel estimation formula is $$\hat{h}_n(i+1)=\hat{h}_n(i)+\mu_n x_n(i)e^*(i),$$

and the second channel estimation formula is $$\hat{h}_s(i+1)=\hat{h}_s(i)+\mu_s \hat{s}(i)e^*(i),$$

where the $\mu_n$ is a step parameter of the first channel estimation formula, the $\mu_s$ is a step parameter of the second channel estimation formula, the $e^*(i)$ is a conjugate transpose of a difference $e(i)$ between the received signal and a sum of the self-interference signal at the i-th instant and the estimation value of the received opposite-end transmission signal at the i-th instant, the $x_n(i)$ is the local-end transmission signal at the i-th instant, the $\hat{s}(i)$ is the estimation value of the opposite-end transmission signal at the i-th instant, the $\hat{h}_n(i)$ is the estimation value of the self-interference channel at the i-th instant, the $\hat{h}_s(i)$ is the estimation value of the communication channel at the i-th instant, the $\hat{h}_n(i+1)$ is the estimation value of the self-interference channel at the (i+1)-th instant, and the $\hat{h}_s(i+1)$ is the estimation value of the communication channel at the (i+1)-th instant.

In this way, the first transceiver obtains the estimation value of the self-interference channel at the (i+1)-th instant with the first channel estimation formula based on the obtained estimation value of the self-interference channel at the i-th instant, the local-end transmission signal at the i-th instant, the estimation value of the communication channel at the i-th instant and the estimation value of the opposite-end transmission signal at the i-th instant. The first transceiver obtains the estimation value of the communication channel at the (i+1)-th instant with the second channel estimation formula based on the estimation value of the communication channel at the i-th instant, the estimation value of the opposite-end transmission signal at the i-th instant, the estimation value of the self-interference channel at the i-th instant and the local-end transmission signal at the i-th instant. Compared with a case that the transceivers estimate the self-interference channel and the communication channel by frequently transmitting the pilot signals in the conventional technology, the first transceiver estimates the estimation value of the self-interference channel at the (i+1)-th instant and the estimation value of the communication channel at the (i+1)-th instant based on the related parameters obtained at the i-th instant, thereby reducing the transmission times of the pilot signals and effectively improving the utilization rate of the communication resources.

Figure 2:
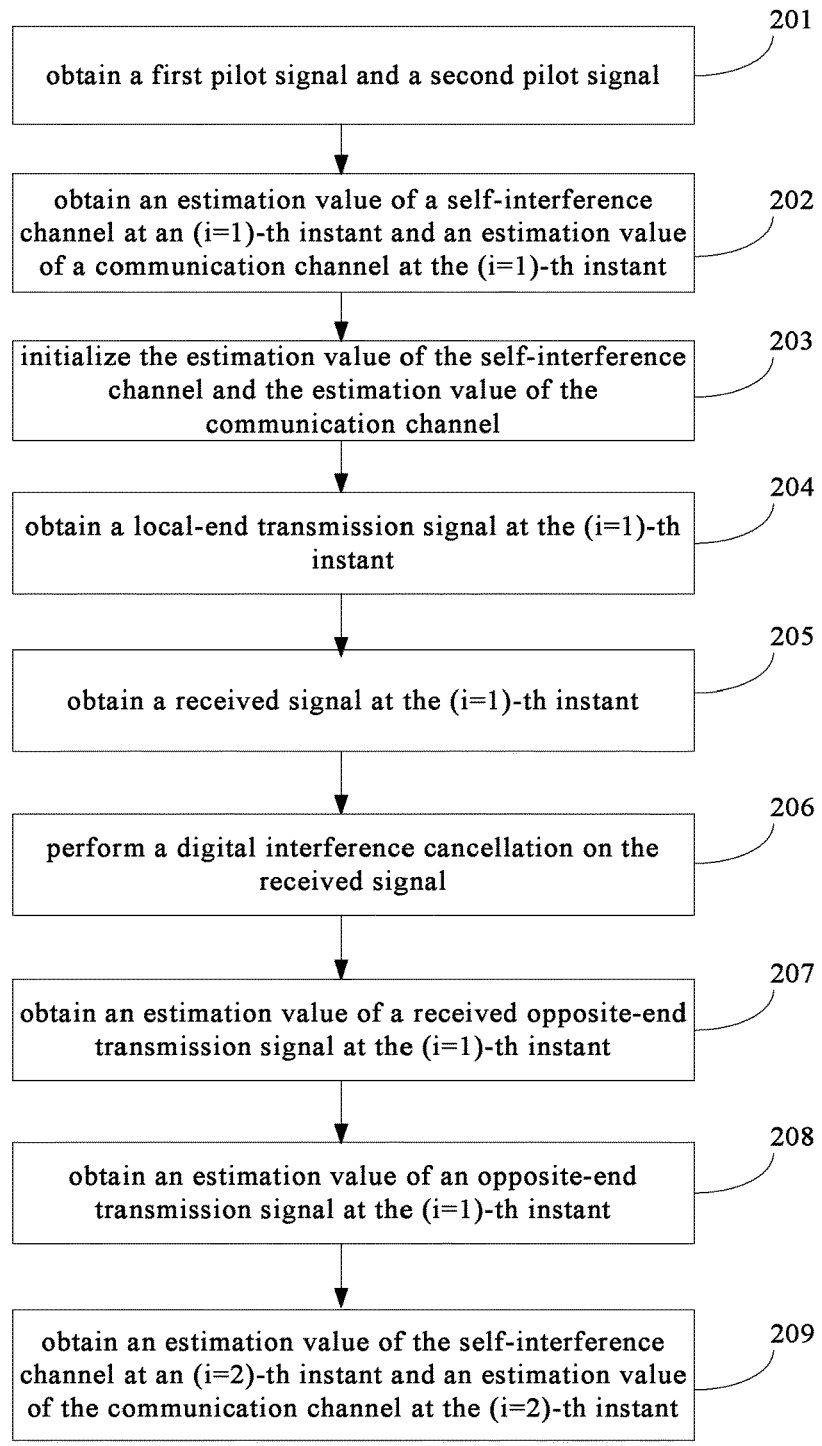
FIG. 2 is a flow chart of a method for channel estimation according to another embodiment of the present.

A method for channel estimation is provided according to an embodiment of the present application, which is applied to a first transceiver. It is assumed that the first transceiver is a local-end transceiver, the second transceiver is an opposite-end transceiver, the first transceiver includes a first transmitter and a first receiver, the second transceiver includes a second transmitter and a second receiver. As shown in FIG. 2, in a case that i is equal to 1, the method includes the follows.

In step S201, a first pilot signal and a second pilot signal are obtained.

Generally, the first pilot signal may be inserted into a time domain of a local-end transmission signal, a frequency domain of the local-end transmission signal, or both the time domain and the frequency domain of the local-end transmission signal at a uniform interval, before the local-end transmission signal is transmitted from the first transceiver to the first transceiver. A block-type pilot is formed by inserting the first pilot signal into the time domain of the local-end transmission signal. A comb-type pilot is formed by inserting the first pilot signal into the frequency domain of the local-end transmission signal. A scattered pilot is formed by inserting the first pilot signal into both the time domain and the frequency domain of the local-end transmission signal at the uniform interval. Similarly, the second pilot signal may be inserted into a time domain of an opposite-end transmission signal, a frequency domain of the opposite-end transmission signal, or both the time domain and the frequency domain of the opposite-end transmission signal at a uniform interval, before the opposite-end transmission signal is transmitted from the second transceiver to the first transceiver. A block-type pilot is formed by inserting the second pilot signal into the time domain of the opposite-end transmission signal. A comb-type pilot is formed by inserting the second pilot signal into the frequency domain of the opposite-end transmission signal. A scattered pilot is formed by inserting the second pilot signal into both the time domain and the frequency domain of the opposite-end transmission signal at the uniform interval.

Illustratively, the first transceiver may insert the first pilot signal into the time domain of the local-end transmission signal $x_n(1)$ before transmitting the local-end transmission signal $x_n(1)$ to the first transceiver; and obtains a received first pilot signal. The first transceiver knows the first pilot signal. Then, the first transceiver estimates the self-interference channel with a minimum mean square error algorithm based on the received first pilot signal and the known first pilot signal, to obtain the estimation value $\hat{h}_n$ of the self-interference channel. The received first pilot signal is a first pilot signal transmitted through the self-interference channel. The second transceiver may insert the second pilot signal into the time domain of the opposite-end transmission signal $s(1)$ before transmitting the opposite-end transmission signal $s(1)$ to the first transceiver. The first transceiver obtains a received second pilot signal, and knows the second pilot signal. Then, the first transceiver estimates the communication channel with the minimum mean square error algorithm based on the received second pilot signal and the known second pilot signal, to obtain the estimation value $\hat{h}_s$ of the communication channel. The received second pilot signal is a second pilot signal transmitted through the communication channel. It should be noted that the (i=1)-th instant is an instant at which a signal is transmitted or received, which may be in units of seconds (s), milliseconds (ms) and so on. Alternatively, the (i=1)-th instant is an instant at which a signal frame is transmitted or received. In a process of inserting the first pilot signal into the time domain of the local-end transmission signal and inserting the second pilot signal into the time domain of the opposite-end transmission signal, the first pilot signal and the second pilot signal are inserted at a preset time interval, where the preset time interval is one unit of time such as 1 s, 1 ms or one signal frame, and the i is larger than or equal to 0. The least mean square criterion is that a square of a difference between a pilot signal transmitted through a channel and the known pilot signal is minimized.

In step S202, the estimation value $\hat{h}_n$ of the self-interference channel at the (i=1)-th instant and the estimation value $\hat{h}_s$ of the communication channel at the (i=1)-th instant are obtained.

The first transceiver inserts the first pilot signal is inserted into the time domain of the local-end transmission signal $x_n(1)$; and the local-end transmission signal, in which the first pilot signal is inserted, is transmitted through the self-interference channel. The first transceiver extracts the received first pilot signal which is transmitted through the self-interference channel, from a received local-end transmission signal. The first transceiver estimates the self-interference channel with the minimum mean square error algorithm based on the received first pilot signal and the first pilot signal known by the first transceiver, to obtain the estimation value $\hat{h}_n$ of the self-interference channel at the (i=1)-th instant. The second transceiver inserts the second pilot signal into the time domain of the opposite-end transmission signal $s(1)$, and the opposite-end transmission signal, in which the second pilot signal is inserted, is transmitted through the communication channel. The first transceiver extracts the received second pilot signal which is transmitted through the communication channel, from a received opposite-end transmission signal. Then, the first transceiver estimates the communication channel with the minimum mean square error algorithm based on the received second pilot signal and the second pilot signal known by the first transceiver, to obtain the estimation value $\hat{h}_s$ of the communication channel at the (i=1)-th instant, where the n represents the n-th transmitting antenna of the local-end transmitter, and the n is larger than or equal to 1.

Usually, a channel estimation based on a pilot insertion is that: a pilot is inserted into a transmission signal; an inverse Fourier transform is performed on the transmission signal, in which the pilot is inserted; and a cyclic prefix is added on the transmission signal, on which the inverse Fourier transform is performed; and a channel transmission is performed on the transmission signal added with the cyclic prefix; then the cyclic prefix is removed from a received transmission signal; a Fourier transform is performed, and a channel estimation is performed based on the MMSE (Minimum Mean Square Error, minimum mean square error) method. For example, the first transceiver inserts the first pilot signal into the time domain of the local-end transmission signal $x_n(i)$, i.e., $$x_n(i) = \begin{cases} x_d \\ x_p \end{cases},$$

where the $x_d$ is a data point signal of the local-end transmission signal, and the $x_p$ is a pilot point signal of the local-end transmission signal. The first transceiver obtains the received local-end transmission signal $y_n(i)=\text{IDFT}(x(i)) \otimes h(i)+nv(i)$, where $0 \leq i \leq N-1$, IDFT represents an inverse discrete Fourier transform (Inverse Discrete Fourier Transform), the n is the number of dimensions of the inverse discrete Fourier transform IDFT, and the nv(k) is a noise signal. Then, a N-point DFT (Discrete Fourier Transform, discrete Fourier transform) is performed on the received local-end transmission signal to obtain $Y_n(k)=X(k)H(k)+NV(k)$, where $$Y_n(k) = \sum_{i=0}^{N-1} y(i)e^{\frac{-j2\pi ik}{N}},$$

the H(k) is a frequency-domain channel transfer function of the self-interference channel, i.e., a time-domain channel impulse response h(i) in the form of frequency domain, and the NV(k) is a noise signal of the self-interference channel, i.e., the nv(k) in the form of frequency domain. The N-point discrete Fourier transform DFT is performed on the received local-end transmission signal to express it in a matrix form: Y=XDh+NV, where the $$D = \begin{pmatrix} W^{0*0} & L & W^{(N-1)*0} \\ M & O & M \\ W^{0*(N-1)} & L & W^{(N-1)*(N-1)} \end{pmatrix}$$

is a discrete Fourier transform matrix D, the $$W^{k*i} = e^{\frac{-j2\pi ik}{N}},$$

$0 \leq i$, $k \leq N-1$, and H=Dh. Similarly, the H(k) and the NV(k) may be expressed by multiplying the matrix D with a time-domain signal matrix. The channel transfer function $H_p$ of the pilot point signal of the local-end transmission signal may be expressed as $H_p=[H_p(0), L \ H_p(N_p-1)]$, where the known pilot signal is $$x_p^* = \begin{pmatrix} x_{p0} & & 0 \\ & O & \\ 0 & & x_{N_p-1} \end{pmatrix} = X_p,$$

and $N_p$ is the number of inserted pilot points. When a channel impulse response h is not relevant with a noise vector nv, an estimation value $h_{pmmse}$ of the time-domain channel impulse response may be expressed as $h_{pmmse}=R_{hpYp}*R^{-1}{}_{YpYP}*Y_p$ based on the minimum mean square error algorithm, where the $R_{hPYp}$ is a cross-correlation matrix between the channel impulse response of the pilot point signal of the local-end transmission signal and the received local-end transmission signal, i.e., $R_{hpYp}=E\{h_p Y_p{}^H\}$, and the $Y_p{}^H$ is a conjugate transpose of the matrix $Y_p$ for the pilot point signal of the local-end transmission signal. The cross-correlation matrix $R_{hpYp}=E\{h_p h_p{}^H\}D_p{}^H X_p{}^H=R_{hphp}D_p{}^H X_p{}^H$ is obtained based on Y=XDh+NV, where a self-correlation matrix of the channel impulse response at the pilot point is $R_{hphp}=E\{h_p h_p^H\}$. The cross-correlation matrix of the $Y_p$ at a pilot point of the received local-end transmission signal is $R_{YpYp}=E\{Y_p Y_p^H\}$. The cross-correlation matrix $R_{hpYp}=X_p D_p R_{hphp} D_p^H X_p^H + \sigma_{nv}^2 I$ is obtained based on the Y=XDh+NV, where the $\sigma_{nv}^2$ is a variance of the noise nv, i.e., a power of the noise. An estimation value $H_{pmmse}$ of the frequency-domain channel transfer function based on the minimum mean square error algorithm is an estimation value $h_{pmmse}$ of the time-domain channel impulse response in the form of frequency domain, then $H_{pmmse}=D_p h_{pmmse}$, and $h_{pmmse}=R_{hpYp}*R^{-1}_{YpYP}*Y_p$. Similarly, the communication channel is estimated based on the minimum mean square error algorithm. The process of estimating the self-interference channel and the communication channel based on the pilot signals are illustratively described according to embodiments of the present application. The self-interference channel and the communication channel may be estimated in other ways in practical applications, which are not limited by the embodiments of the present application.

In step S203, the estimation value of the self-interference channel and the estimation value of the communication channel are initialized.

The first transceiver estimates the estimation value $\hat{h}_n$ of the self-interference channel at the (i=1)-th instant with the minimum mean-square error algorithm based on the received first pilot signal and the first pilot signal known by the first transceiver, which is used as an initial value $\hat{h}_n(0)$ of the self-interference channel. The first transceiver estimates the estimation value of the communication channel at the (i=1)-th instant $\hat{h}_s$ with the minimum mean square error algorithm based on the received second pilot signal and the second pilot signal known by the first transceiver, which is used as an initial value $\hat{h}_s(0)$ of the communication channel.

In step S204, the local-end transmission signal at the (i=1)-th instant $x_n(1)$ is obtained.

The first transceiver transmits the local-end transmission signal $x_n(1)$ to the first transceiver, and receives the local-end transmission signal $x_n(1)$. The first transmitter and the first receiver are located at the same transceiver, and thus the local-end transmission signal $x_n(1)$ at the (i=1)-th instant is a known signal for the first receiver of the first transceiver. In practical applications, the local-end transmission signal $x_n(1)$ is used to estimate the self-inference channel.

In step S205, a received signal y(1) at the (i=1)-th instant is obtained.

The first transceiver receives received signal y(1) including the received local-end transmission signal $y_n(1)$ and the received opposite-end transmission signal $y_s(1)$, i.e., $y(1)=y_n(1)+y_s(1)+\upsilon$. The received local-end transmission signal is a local-end transmission signal which is transmitted by the first transceiver, transmitted through the self-interference channel and finally received by the first transceiver. The received opposite-end transmission signal is an opposite-end transmission signal which is transmitted by the second transceiver, transmitted through the communication channel and finally received by the first transceiver. The $\upsilon$ is a Gaussian white noise.

In step S206, a digital interference cancellation is performed on the received signal y(1).

Illustratively, the self-interference signal $\hat{y}_n(1)$ is obtained, based on the estimation value $\hat{h}_n$ of the self-interference channel estimated based on the first pilot signal, and the local-end transmission signal $x_n(1)$ transmitted from the first transceiver to the first transceiver, i.e., $\hat{y}_n(1)=\hat{h}_n^H x_n(1)$. The self-interference signal is an estimation value of the local-end transmission signal received by the first transceiver at the (i=1)-th instant $\hat{y}_n(1)$. The $\hat{h}_n^H$ is a conjugate transpose of the self-interference channel. The $x_n(1)$ is the local-end transmission signal, which is a known signal. Then, the digital interference cancellation is performed on the received signal y(1) received by the first transceiver. The self-interference signal $\hat{y}_n(1)$ is subtracted from the received signal y(1), i.e., $\hat{y}_s(1)=y(1)-\hat{y}_n(1)$, to obtain an estimation value $\hat{y}_s(1)$ of the received opposite-end transmission signal at the (i=1)-th instant, where $\hat{y}_s(1)$ is the estimation value of the received opposite-end transmission signal at the (i=1)-th instant.

In step S207, the estimation value of the received opposite-end transmission signal at the (i=1)-th instant is obtained.

The first transceiver receives the received signal y(1) including the received local-end transmission signal $y_n(1)$ and the received opposite-end transmission signal $y_s(1)$, i.e., $y(1)=y_n(1)+y_s(1)+\upsilon$, where the $\upsilon$ is a Gaussian white noise. The digital interference cancellation is performed on the received signal by subtracting the self-interference signal from the received signal, to obtain the received opposite-end transmission signal.

Illustratively, when receiving the received signal is y(1), the first transceiver obtains the self-interference signal $\hat{y}_n(1)$, according to the estimation value $\hat{h}_n$ of the self-interference channel estimated based on the first pilot signal, and the local-end transmission signal $x_n(1)$ transmitted from the first transceiver to the first transceiver. The self-interference signal $\hat{y}_n(1)$ is the estimation value $\hat{y}_n(1)$ of the local-end transmission signal received by the first transceiver at the (i=1)-th instant, i.e., $\hat{y}_n(1)=\hat{h}_n^H x_n(1)$, where the $\hat{h}_n^H$ is the conjugate transpose of the self-interference channel, and the $x_n(1)$ is the local-end transmission signal as a known signal. The digital interference cancellation is performed on the received signal y(1) received by the first transceiver, by subtracting the self-interference signal $\hat{y}_n(1)$ from the received signal y(1) received by the first transceiver, to obtain the estimation value $\hat{y}_s(1)$ of the received opposite-end transmission signal at the (i=1)-th instant, i.e., $\hat{y}_s(1)=y(1)-\hat{y}_n(1)$, where $\hat{y}_s(1)$ is the estimation value of the received opposite-end transmission signal at the (i=1)-th instant.

In step S208, an estimation value $\hat{s}(1)$ of the opposite-end transmission signal at the (i=1)-th instant is obtained.

The second transceiver transmits the opposite-end transmission signal s(1) to the first transceiver. The first transceiver obtains the received opposite-end transmission signal $y_s(1)$. The received opposite-end transmission signal $y_s(1)$ is an opposite-end transmission signal transmitted through the communication channel, i.e., $y_s(1)=h_s^H(1)s(1)$, where the $H_s^H$ is a conjugate transpose of communication channel, and the opposite-end transmission signal s(1) is a useful signal transmitted from the second transceiver to the first transceiver.

Illustratively, the digital interference cancellation is performed on the received signal y(1) received by the first transceiver, to obtain the estimation value $\hat{y}_s(1)$ of the received opposite-end transmission signal at the (i=1)-th instant. The estimation value $\hat{s}(1)$ of the opposite-end transmission signal is obtained based on the estimation value $\hat{h}_s$ of the communication channel at the (i=1)-th instant, i.e., $\hat{s}(1)=\{\hat{h}_s \hat{h}_s^H\}^{-1}\{\hat{h}_s \hat{y}_s(1)\}$, where the estimation value $\hat{s}(1)$ of the opposite-end transmission signal is an estimation of a useful signal transmitted from the second transceiver to the first transceiver.

In step S209, an estimation value $\hat{h}_n(2)$ of the self-interference channel at an (i=2)-th instant and an estimation value $\hat{h}_s(2)$ of the communication channel at the (i=2)-th instant are obtained.

The estimation value $\hat{h}_n(2)$ of the self-interference channel at the (i=2)-th instant is obtained with a first channel estimation formula, based on the estimation value $\hat{h}_n$ of the self-interference channel, the local-end transmission signal $x_n(1)$, the estimation value $\hat{h}_s$ of the communication channel and the estimation value $\hat{s}(1)$ of the opposite-end transmission signal.

The estimation value $\hat{h}_s(2)$ of the communication channel at the (i=2)-th instant is obtained with a second channel estimation formula, based on the estimation value $\hat{h}_s$ of the communication channel, the estimation value $\hat{s}(1)$ of the opposite-end transmission signal, the estimation value $\hat{h}_n$ of the self-interference channel and the local-end transmission signal $x_n(1)$.

The first channel estimation formula is $$\hat{h}_n(2)=\hat{h}_n(1)+\mu_n x_n(1)e^*(1),$$

and the second channel estimation formula is $$\hat{h}_s(2)=\hat{h}_s(1)+\mu_s \hat{s}(1)e^*(1),$$

where the $\mu_n$ is a step parameter of the self-interference channel estimation update formula, the $\mu_s$ is a step parameter of the communication channel estimation update equation, the $e^*(1)$ is a conjugate transpose of a difference $e(1)$ of the received signal and a sum of the self-interference signal at the (i=1)-th instant and the estimation value of the received opposite-end transmission signal at the (i=1)-th instant, the $x_n(1)$ is the local-end transmission signal at the (i=1)-th instant, the $\hat{s}(1)$ is the estimation value of the opposite-end transmission signal at the (i=1)-th instant, the $\hat{h}_n(1)$ is the estimation value of the self-interference channel at the (i=1)i-th instant, the $\hat{h}_s(1)$ is the estimation value of the communication channel at the (i=1)-th instant, the $\hat{h}_n(2)$ is the estimation value of the self-interference channel at the (i=2)-th instant, and the $\hat{h}_s(2)$ is the estimation value of the communication channel at the (i=2)-th instant.

Specifically, when receiving a received signal y(2) at the (i=2)-th instant, the first transceiver obtains a self-interference signal at the (i=2)-th instant $\hat{y}_n(2)$ by multiplying the estimation value $\hat{h}_n(2)$ of the self-interference channel at the (i=2)-th instant by a local-end transmission signal $x_n(2)$ transmitted from the first transceiver to the first transceiver, where the self-interference signal is an estimation value of a local-end transmission signal received by the first transceiver at the (i=2)i-th instant, and the local-end transmission signal $x_n(2)$ transmitted from by the first transceiver to the first transceiver at the (i=2)i-th instant is a known signal. Then, an estimation value $\hat{y}_s(2)$ of a received opposite-end transmission signal at the (i=2)-th instant is obtained, by performing the digital interference cancellation on a received signal y(2) at the (i=2)-th instant with a self-interference signal $\hat{y}_n(2)$ at the (i=2)-th instant, that is, subtracting the self-interference signal $\hat{y}_n(2)$ at the (i=2)-th instant from the received signal y(2) at the (i=2)-th instant. Finally, an estimation value $\hat{s}(2)$ of the opposite-end transmission signal at the (i=2)-th instant is obtained based on the estimation value $\hat{h}_s(2)$ of the communication channel at the (i=2)-th instant, and the estimation value $\hat{y}_s(2)$ of the received opposite-end transmission signal at the (i=2)-th instant.

An estimation value $\hat{h}_n(3)$ of the self-interference channel at the (i=3)-th instant is obtained with the first channel estimation formula, based on the estimation value $\hat{h}_n(2)$ of the self-interference channel at the (i=2)-th instant, the local-end transmission signal $x_n(2)$ at the (i=2)-th instant, the estimation value $\hat{h}_s(2)$ of the communication channel at the (i=2)-th instant, and the estimation value $\hat{s}(2)$ of the opposite-end transmission signal at the (i=2)-th instant.

The estimation value $\hat{h}_s(3)$ of the communication channel at the (i=3)-th instant is obtained with the second channel estimation formula, based on the estimation value $\hat{h}_s(2)$ of the communication channel at the (i=2)-th instant, the estimation value $\hat{s}(2)$ of the opposite-end transmission signal at the (i=2)-th instant, the estimation value $\hat{h}_n(2)$ of the self-interference channel at the (i=2)-th instant, and the local-end transmission signal $x_n(2)$ at the (i=2)-th instant.

The first channel estimation formula is $$\hat{h}_n(3)=\hat{h}_n(2)+\mu_n x_n(2)e^*(2),$$

and the second channel estimation formula is $$\hat{h}_s(3)=\hat{h}_s(2)+\mu_s \hat{s}(2)e^*(2),$$

where the $\mu_n$ is a step parameter of the first channel estimation formula, the $\mu_s$ is a step parameter of the second channel estimation formula, the $e^*(2)$ is a conjugate transpose of a difference $e(2)$ of the received signal and a sum of the self-interference signal at the (i=2)-th instant and the estimation value of the received opposite-end transmission signal at the (i=2)-th instant, the $x_n(2)$ is the local-end transmission signal at the (i=2)-th instant, the $\hat{s}(2)$ is the estimation value of the opposite-end transmission signal at the (i=2)-th instant, the $\hat{h}_n(2)$ is the estimation value of the self-interference channel at the (i=2)-th instant, the $\hat{h}_s(2)$ is the estimation value of the communication channel at the (i=2)-th instant, the $\hat{h}_n(3)$ is the estimation value of the self-interference channel at the (i=3)-th instant, and the $\hat{h}_s(3)$ is the estimation value of the communication channel at the (i=3)-th instant. Similarly, an estimation value $\hat{s}(3)$ of the opposite-end transmission signal at the (i=3)-th instant may be estimated by the estimation value $\hat{h}_n(3)$ of the self-interference channel at the (i=3)-th instant and the estimation value $\hat{h}_s(3)$ of the communication channel at the (i=3)-th instant. For any i-th instant with the i larger than or equal to 0, the self-interference channel and the communication channel can be estimated and a cancellation can be performed on the self-interference signal to obtain a correct and useful signal, based on the method for channel estimation according to the present application, which is not described herein. The estimation value $\hat{h}_n(i+1)$ of the self-interference channel at the (i+1)-th instant and the estimation value $\hat{h}_s(i+1)$ of the communication channel at the (i+1)-th instant are iteratively estimated for preset times, by obtaining the estimation value $\hat{h}_n(i+1)$ of the self-interference channel at the (i+1)-th instant with the first channel estimation formula based on the estimation value $\hat{h}_n(i)$ of the self-interference channel at the i-th instant, the local-end transmission signal at the i-th instant $x_n(i)$, the estimation value $\hat{h}_s(i)$ of the communication channel at the i-th instant and the estimation value $\hat{s}(i)$ of the opposite-end transmission signal at the i-th instant, and obtaining the estimation value $\hat{h}_s(i+1)$ of the communication channel at the (i+1)-th instant with the second channel estimation formula based on the estimation value $\hat{h}_s(i)$ of the communication channel at the i-th instant, the estimation value $\hat{s}(i)$ of the opposite-end transmission signal at the i-th instant, the estimation value $\hat{h}_n(i)$ of the self-interference channel at the i-th instant and the local-end transmission signal at the i-th instant $x_n(i)$. Then, the first transceiver and the second transceiver respectively transmit the first pilot signal and the second pilot signal again to estimate the self-interference channel and the communication channel, so as to initialize the self-interference channel and the communication channel. In this way, the self-interference channel, the communication channel and the opposite-end transmission signal may be estimated more accurately to reduce the accumulated error for iteratively estimating the estimation value $\hat{h}_n(i+1)$ of the self-interference channel at the (i+1)-th instant and the estimation value $\hat{h}_s(i+1)$ of the communication channel at the (i+1)-th instant. The preset times can be set based on a coherence time of channels, and the coherence time of the channels is a maximum time range in which the self-interference channel and the communication channel remain constant. The channel estimation is only schematically described in the embodiments of the application, which is not limited herein.

It should be noted that, the first channel estimation formula and the second channel estimation formula are derived with the minimum mean square error algorithm. Specifically, it is assumed that a calculation formula for the received signal y is:

$$y = y_n + y_s + v \qquad (1)$$
$$= h_n^H x_n + h_s^H s + v$$

where the $y_n$ is a local-end transmission signal which is transmitted by the first transceiver, transmitted through the self-interference channel and received by the first transceiver, the $y_s$ is an opposite-end transmission signal which is transmitted by the second transceiver, transmitted through the communication channel and received by the first transceiver. Thus, the $y_n$ and the $y_s$ are independent and uncorrelated. The $v$ is a Gaussian white noise. It is assumed that the estimation value $\hat{y}$ of the received value includes the estimation value $\hat{y}_n$ of the received local-end transmission signal and the estimation value $\hat{y}_s$ of the received opposite-end transmission signal. The estimation value $\hat{y}_n$ of the received local-end transmission signal is the self-interference signal. A calculation formula for the estimation value $\hat{y}$ of the received value is:

$$\hat{y} = \hat{y}_n + \hat{y}_s \qquad (2)$$
$$= \hat{h}_n^H x_n + \hat{h}_s^H \hat{s}$$

where the $\hat{h}_n$ is the channel estimation of the self-interference channel $h_n$, the $\hat{h}_s$ is the channel estimation of the communication channel $h_s$, the $\hat{h}_n^H$ is the conjugate transpose of the self-interference channel, the $h^H_s$ is the conjugate transpose of communication channel, the $x_n$ is the local-end transmission signal and the $\hat{S}$ is the estimation value of the opposite-end transmission signal. Then the mean square error between the received signal y and the estimation value $\hat{y}$ of the received signal is minimized by updating $\hat{h}_n$ and $\hat{h}_s$, i.e.:

$$E\{|e|^2\} = E\{|y-\hat{y}|^2\} \qquad (3)$$
$$= E\{|y|^2\} + E\{|\hat{y}|^2\} - E\{y^*\hat{y}\} - E\{\hat{y}^*y\}$$

The first term $E\{|y|^2\}=\sigma_d^2$ in the expression (3) is a variance of the received signal. The formula (2) is substituted into the second term of the formula (3) to obtain:

$$E\{|\hat{y}|^2\}=E\{|\hat{y}_n|^2\}+E\{|\hat{y}_s|^2\}+E\{\hat{y}_n^*\hat{y}_s\}+E\{\hat{y}_s^*\hat{y}_n\} \qquad (4)$$

Because the self-interference value $\hat{y}_n$ and the estimation value $\hat{y}_s$ of the received opposite-end transmission signal are uncorrelated, the third term $E\{\hat{y}_n^*\hat{y}_s\}$ and the fourth term $E\{\hat{y}_s^*\hat{y}_n\}$ in the expression (4) are 0, i.e.:

$$E\{|\hat{y}|^2\} = E\{|\hat{y}_n|^2\} + E\{|\hat{y}_s|^2\}$$
$$= \hat{h}_n^H x_n x_n^H \hat{h}_n + \hat{h}_s^H \hat{s}\hat{s}^H \hat{h}_s$$
$$= \hat{h}_n^H R_n \hat{h}_n + \hat{h}_s^H R_s \hat{h}_s$$

where the $R_n=x_n x_n^H$ is an instantaneous estimation value of the autocorrelation matrix of the local-end transmission signal $x_n$, and the $R_s=\hat{s}\hat{s}^H$ is an instantaneous estimation value of the autocorrelation matrix of the opposite-end transmission signal $\hat{s}$. The expression (1) and the expression (2) are substituted into the third term and the fourth term in the expression (3) to obtain $$E\{y^*\hat{y}\} = E\{y_n^*\hat{y}_n\} + E\{y_s^*\hat{y}_s\} + E\{y_n^*\hat{y}_s\} + E\{y_s^*\hat{y}_n\}$$
$$= y_n^H \hat{h}_n^H x_n + y_s^* \hat{h}_s^H \hat{s}$$
$$= \hat{h}_n^H (y_n^* x_n) + \hat{h}_s^H (y_s^* \hat{s})$$
$$= \hat{h}_n^H \beta_n + \hat{h}_s^H \beta_s$$

$$E\{\hat{y}^* y\} = E\{\hat{y}_n^* y_n\} + E\{\hat{y}_s^* y_s\} + E\{\hat{y}_n^* y_s\} + E\{\hat{y}_s^* y_n\}$$
$$= x_n^H \hat{h}_n y_n + \hat{s}^H \hat{h}_s y_s$$
$$= (y_n^* x_n)^H \hat{h}_n + (y_s^* \hat{s}_s)^H \hat{h}_s$$
$$= \beta_n^H \hat{h}_n + \beta_s^H \hat{h}_s$$

where $\beta_n=y_n^* x_n$ is an instantaneous estimation value of a cross-correlation vector of the received local-end transmission signal, the $\beta_s=y_s^* \hat{s}$ is an instantaneous estimation value of a cross-correlation vector of the received opposite-end transmission signal. Through the above derivation, the expression (3) may also be express as:

$$E\{|e|^2\}=\sigma_d^2+(\hat{h}_n^H R_n \hat{h}_n - \hat{h}_n^H \beta_n - \beta_n^H \hat{h}_n) + (\hat{h}_s^H R_s \hat{h}_s - \hat{h}_s^H \beta_s - \beta_s^H \hat{h}_s) \qquad (5)$$

The following gradient vectors are obtained by respectively taking the derivative with respect to the $\hat{h}_n$ and the $\hat{h}_s$ in the expression (5):

$$\nabla J_n = -2\beta_n + 2R_n \hat{h}_n$$

$$\nabla J_s = -2\beta_s + 2R_s \hat{h}_s$$

The first channel estimation formula for the channel estimation value $\hat{h}_n$ of the self-interference channel is obtained based on a method of steepest descent:

$$\hat{h}_n(i+1) = \hat{h}_n(i) - \frac{1}{2}\mu_n \nabla J_n(i)$$
$$= \hat{h}_n(i) + \mu_n [\beta_n(i) - R_n(i)\hat{h}_n(i)]$$
$$= \hat{h}_n(i) + \mu_n x_n(i)[y_n(i) - \hat{y}_n(i)]^*$$

-continued $$= \hat{h}_n(i) + \mu_n x_n(i)[y(i) - \hat{y}_n(i) - \hat{y}_s(i)]^*$$

$$= \hat{h}_n(i) + \mu_n x_n(i)e(i)^*.$$

Similarly, the second channel estimation formula for the channel estimation value $\hat{h}_s$ of the communication channel is obtained:

$$\hat{h}_s(i+1) = \hat{h}_s(i) + \mu_s \hat{s}(i)e(i)^*$$

where the $\mu_n$ is a step parameter of the first channel estimation formula, the $\mu_s$ is a step parameter of the second channel estimation formula, the $e^*(i)$ is a conjugate transpose of a difference e between the received signal and a sum of the self-interference signal at the i-th instant and the estimation value of the received opposite-end transmission signal at the i-th instant, the $x_n(i)$ is the local-end transmission signal at the i-th instant, the $\hat{s}(i)$ is the estimation value of the opposite-end transmission signal at the i-th instant, the $\hat{h}_n(i)$ is the estimation value of the self-interference channel at the i-th instant, the $\hat{h}_s(i)$ is the estimation value of the communication channel at the i-th instant, the $\hat{h}_n(i+1)$ is the estimation value of the self-interference channel at the (i+1)-th instant, and the $\hat{h}_s(i+1)$ is the estimation value of the communication channel at the (i+1)-th instant.

The first transceiver provided according to the embodiments of the present application estimates the self-interference channel based on the known first pilot signal and the first pilot signal transmitted through the self-interference channel, to obtain the estimation value of the self-interference channel at the i-th instant. The first transceiver estimates the communication channel based on the known second pilot signal and the second pilot signal transmitted through the communication channel, to obtain the estimation value of the communication channel at the i-th instant. Then, the self-interference signal at the i-th instant is estimated based on the estimation value of the self-interference channel at the i-th instant and the local-end transmission signal transmitted by the first transceiver at the i-th instant. The estimation value of the received opposite-end transmission signal at the i-th instant is obtained by performing the digital interference cancellation on the received signal received by the first transceiver based on the self-interference signal. The opposite-end transmission signal at the i-th instant is estimated based on the estimation value of the received opposite-end transmission signal at the i-th instant and the estimation value of the communication channel at the i-th instant to obtain the estimation value of the opposite-end transmission signal at the i-th instant. Finally, the estimation value of the self-interference channel at the (i+1)-th instant is obtained with the first channel estimation formula, based on the estimation value of the self-interference channel at the i-th instant, the local-end transmission signal at the i-th instant, the estimation value of the communication channel at the i-th instant and the estimation value of the opposite-end transmission signal at the i-th instant. The estimation value of the communication channel at the (i+1)-th instant is obtained with the second channel estimation formula, based on the estimation value of the communication channel at the i-th instant, the estimation value of the opposite-end transmission signal at the i-th instant, the estimation value of the self-interference channel at the i-th instant and the local-end transmission signal at the i-th instant. Compared with a case that the transceivers estimate the self-interference channel and the communication channel by frequently transmitting the pilot signals in the conventional technology, the method the transmission times of the pilot signal may be reduced and the utilization rate of the communication resources may be improved effectively.

Figure 3:
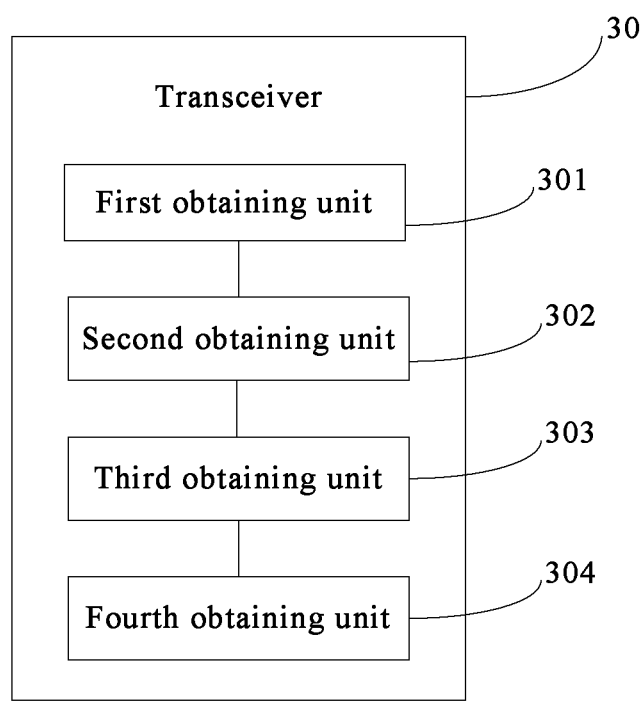
FIG. 3 is a schematic structural diagram of a transceiver according to an embodiment of the present.

As shown in FIG. 3, a transceiver 30 is provided according to an embodiment of the present application, which includes the follows.

A first obtaining unit 301 is configured to obtain an estimation value of a self-interference channel at an i-th instant and an estimation value of a communication channel at the i-th instant, where the i is larger than or equal to 0.

A second obtaining unit 302 is configured to obtain a local-end transmission signal at the i-th instant.

A third obtaining unit 303 is configured to obtain an estimation value of an opposite-end transmission signal at the i-th instant.

A fourth obtaining unit 304 is configured to obtain an estimation value of the self-interference channel at an (i+1)-th instant and an estimation value of the communication channel at the (i+1)-th instant, based on the estimation value of the self-interference channel at the i-th instant, the estimation value of the communication channel at the i-th instant, the local-end transmission signal at the i-th instant and the estimation value of the opposite-end transmission signal at the i-th instant, where the (i+1)-th instant differs from the i-th instant by one unit of time.

The third obtaining unit 303 is specifically configured to:
 obtain a received signal at the i-th instant;
 obtain a self-interference signal at the i-th instant based on the estimation value of the self-interference channel at the i-th instant, where the self-interference signal at the i-th instant is an estimation value of a local-end transmission signal received by the transceiver 30 at the i-th instant;
 perform a digital interference cancellation on the received signal at the i-th instant based on the self-interference signal at the i-th instant, to obtain an estimation value of a received opposite-end transmission signal at the i-th instant; and
 obtain the estimation value of the opposite-end transmission signal at the i-th instant based on the estimation value of the received opposite-end transmission signal at the i-th instant and the estimation value of the communication channel at the i-th instant.

Figure 4:
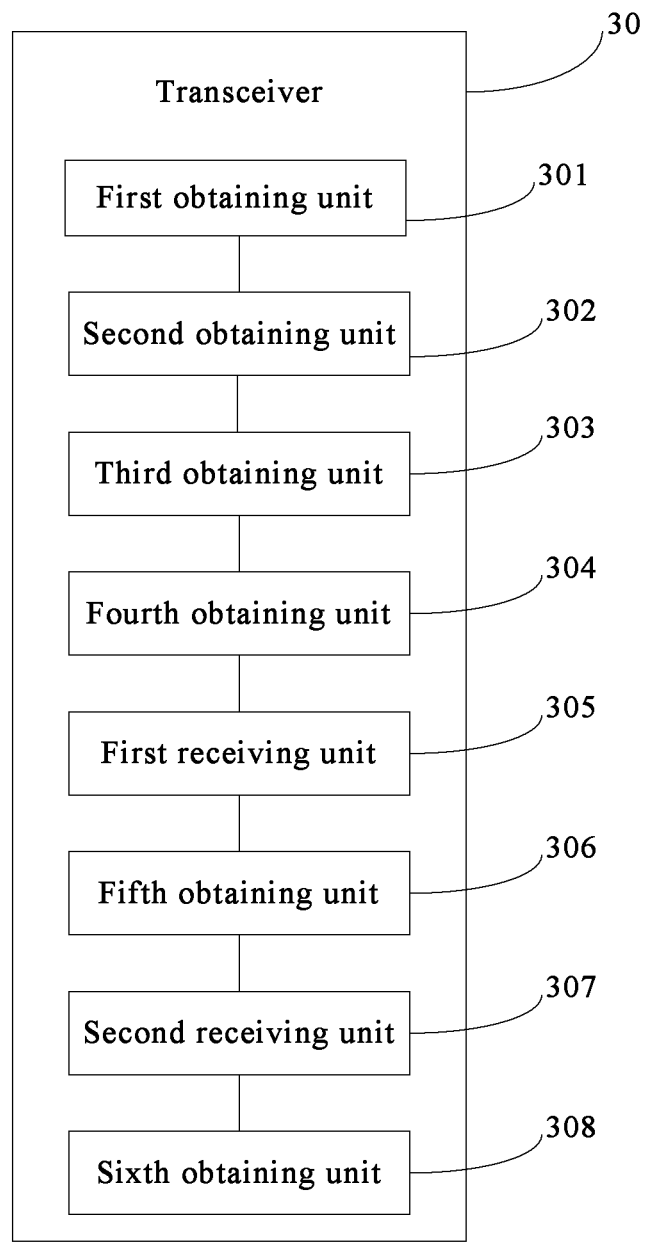
FIG. 4 is a schematic structural diagram of a transceiver according to another embodiment of the present.

As shown in FIG. 4, in a case that the i is equal to 0, the transceiver 30 further includes the follows.

A first receiving unit 305 is configured to receive a first pilot signal transmitted by the transceiver.

A fifth obtaining unit 306 is configured to obtain the estimation value of the self-interference channel at the i-th instant based on the first pilot signal.

A second receiving unit 307 is configured to receive a second pilot signal transmitted by the transceiver.

A sixth obtaining unit 308 is configured to obtain the estimation value of the communication channel at the i-th instant based on the second pilot signal.

The fourth obtaining unit 304 is specifically configured to:
 obtain the estimation value of the self-interference channel at the (i+1)-th instant with a first channel estimation formula, based on the estimation value of the self-interference channel at the i-th instant, the local-end transmission signal at the i-th instant, the estimation value of the communication channel at the i-th instant and the estimation value of the opposite-end transmission signal at the i-th instant; and
 obtain the estimation value of the communication channel at the (i+1)-th instant with a second channel estimation equation, based on the estimation value of the communication channel at the i-th instant, the estimation value of the opposite-end transmission signal at the i-th instant, the estimation value of the self-interference channel at the i-th instant and the local-end transmission signal at the i-th instant, where the first channel estimation formula is $$\hat{h}_n(i+1)=\hat{h}_n(i)+\mu_n x_n(i)e^*(i),$$

the second channel estimation formula is $$\hat{h}_s(i+1)=\hat{h}_s(i)+\mu_s \hat{s}(i)e^*(i),$$

the $\mu_n$ is a step parameter of the first channel estimation formula, the $\mu_s$ is a step parameter of the second channel estimation formula, the $e^*(i)$ is a conjugate transpose of a difference $e(i)$ between the received signal and a sum of the self-interference signal at the i-th instant and the estimation value of the received opposite-end transmission signal at the i-th instant, the $x_n(i)$ is the local-end transmission signal at the i-th instant, the $\hat{s}(i)$ is the estimation value of the opposite-end transmission signal at the i-th instant, the $\hat{h}_n(i)$ is the estimation value of the self-interference channel at the i-th instant, the $\hat{h}_s(i)$ is the estimation value of the communication channel at the i-th instant, the $\hat{h}_n(i+1)$ is the estimation value of the self-interference channel at the (i+1)-th instant, and the $\hat{h}_s(i+1)$ is the estimation value of the communication channel at the (i+1)-th instant.

Figure 5:
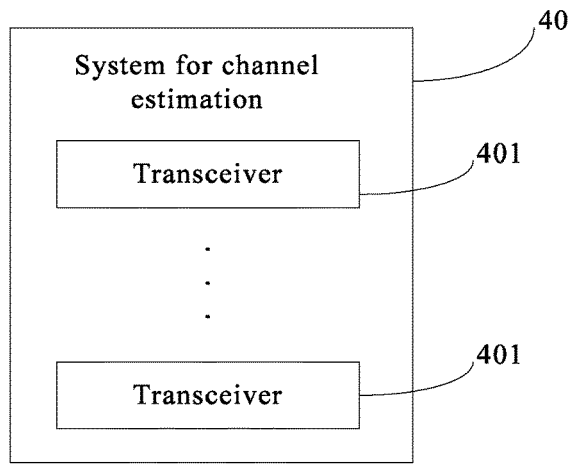
FIG. 5 is a schematic diagram of a system for channel estimation according to an embodiment of the present.

As shown in FIG. 5, a system 40 for channel estimation is provided according to an embodiment of the present application, which includes at least two transceivers, where each of the at least two transceivers may be a transceiver 401 shown in FIG. 5. The transceiver 401 is configured to obtain an estimation value of a self-interference channel at an i-th instant and an estimation value of a communication channel at the i-th instant, where the i is larger than or equal to 0; obtain a local-end transmission signal at the i-th instant; obtain an estimation value of an opposite-end transmission signal at the i-th instant; and obtain an estimation value of the self-interference channel at an (i+1)-th instant and an estimation value of the communication channel at the (i+1)-th instant, based on the estimation value of the self-interference channel at the i-th instant, the estimation value of the communication channel at the i-th instant, the local-end transmission signal at the i-th instant and the estimation value of the opposite-end transmission signal at the i-th instant, where the (i+1)-th instant differs from the i-th instant by one unit of time.

Figure 6:
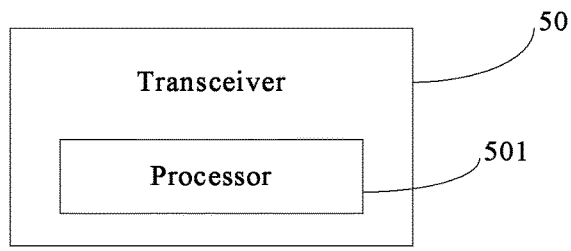
FIG. 6 is a schematic structural diagram of a transceiver according to still another embodiment of the present.

As shown in FIG. 6, a transceiver 50 for channel estimation is provided according to an embodiment of the present application, which includes a processor 501.

The processor 501 is configured to:

obtain an estimation value of a self-interference channel at an i-th instant and an estimation value of a communication channel at the i-th instant, where the i is larger than or equal to 0;

obtain a local-end transmission signal at the i-th instant;

obtain an estimation value of an opposite-end transmission signal at the i-th instant; and obtain an estimation value of the self-interference channel at an (i+1)-th instant and an estimation value of the communication channel at the (i+1)-th instant, based on the estimation value of the self-interference channel at the i-th instant, the estimation value of the communication channel at the i-th instant, the local-end transmission signal at the i-th instant and the estimation value of the opposite-end transmission signal at the i-th instant, where the (i+1)-th instant differs from the i-th instant by one unit of time.

The processor 501 is specifically configured to:

obtain a received signal at the i-th instant;

obtain a self-interference signal at the i-th instant based on the estimation value of the self-interference channel at the i-th instant, where the self-interference signal at the i-th instant is an estimation value of a local-end transmission signal received by the transceiver at the i-th instant;

perform a digital interference cancellation on the received signal at the i-th instant based on the self-interference signal at the i-th instant, to obtain an estimation value of a received opposite-end transmission signal at the i-th instant; and obtain the estimation value of the opposite-end transmission signal at the i-th instant based on the estimation value of the received opposite-end transmission signal at the i-th instant and the estimation value of the communication channel at the i-th instant.

Figure 7:
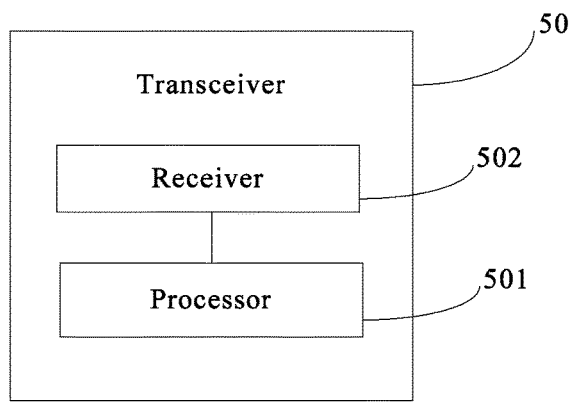
FIG. 7 is a schematic structural diagram of a transceiver according to yet another embodiment of the present.

As shown in FIG. 7, in a case that the i is equal to 0, the transceiver 50 further includes a receiver 502 configured to receive a first pilot signal transmitted by the transceiver, and the processor 501 is further configured to obtain the estimation value of the self-interference channel at the i-th instant based on the first pilot signal;

the receiver 502 is further configured to receive a second pilot signal transmitted by the transceiver; and the processor 501 is further configured to obtain the estimation value of the communication channel at the i-th instant based on the second pilot signal The processor 501 is specifically configured to:

obtain the estimation value of the self-interference channel at the (i+1)-th instant with a first channel estimation formula, based on the estimation value of the self-interference channel at the i-th instant, the local-end transmission signal at the i-th instant, the estimation value of the communication channel at the i-th instant and the estimation value of the opposite-end transmission signal at the i-th instant; and obtain the estimation value of the communication channel at the (i+1)-th instant with a second channel estimation formula, based on the estimation value of the communication channel at the i-th instant, the estimation value of the opposite-end transmission signal at the i-th instant, the estimation value of the self-interference channel at the i-th instant and the local-end transmission signal at the i-th instant, where the first channel estimation formula is $$\hat{h}_n(i+1)=\hat{h}_n(i)+\mu_n x_n(i)e^*(i),$$

the second channel estimation formula is $$\hat{h}_s(i+1)=\hat{h}_s(i)+\mu_s \hat{s}(i)e^*(i),$$

where the $\mu_n$ is a step parameter of the first channel estimation formula, the $\mu_s$ is a step parameter of the second channel estimation formula, the $e^*(i)$ is a conjugate transpose of a difference $e(i)$ between the received signal and a sum of the self-interference signal at the i-th instant and the estimation value of the received opposite-end transmission signal at the i-th instant, the $x_n(i)$ is the local-end transmission signal at the i-th instant, the $\hat{s}(i)$ is the estimation value of the opposite-end transmission signal at the i-th instant, the $\hat{h}_n(i)$ is the estimation value of the self-interference channel at the i-th instant, the $\hat{h}_s(i)$ is the estimation value of the communication channel at the i-th instant, the $\hat{h}_n(i+1)$ is the estimation value of the self-interference channel at the (i+1)-th instant, and the $\hat{h}_s(i+1)$ is the estimation value of the communication channel at the (i+1)-th instant.

Figure 8:
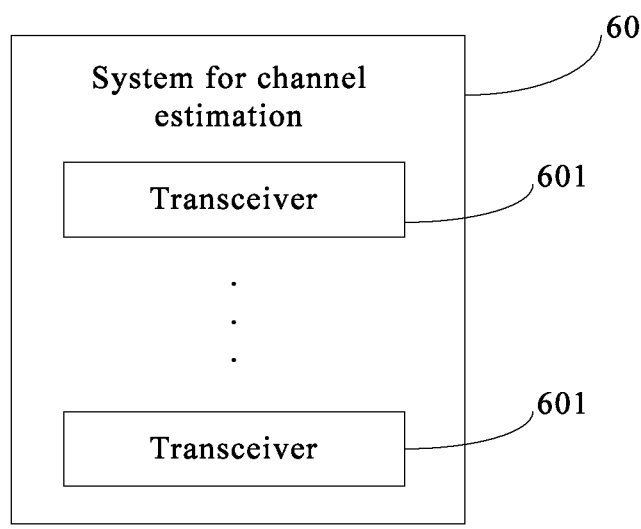
FIG. 8 is a schematic diagram of a system for channel estimation according to another embodiment of the present.

As shown in FIG. 8, a system 60 for channel estimation is provided according to an embodiment of the present application, which includes at least two transceivers, where each of the at least two transceivers may be a transceiver 601 shown in FIG. 8, the transceiver 601 is configured to obtain an estimation value of a self-interference channel at an i-th instant and an estimation value of a communication channel at the i-th instant, where the i is larger than or equal to 0; obtain a local-end transmission signal at the i-th instant; obtain an estimation value of an opposite-end transmission signal at the i-th instant; and obtain an estimation value of the self-interference channel at an (i+1)-th instant and an estimation value of the communication channel at the (i+1)-th instant, based on the estimation value of the self-interference channel at the i-th instant, the estimation value of the communication channel at the i-th instant, the local-end transmission signal at the i-th instant and the estimation value of the opposite-end transmission signal at the i-th instant, where the (i+1)-th instant differs from the i-th instant by one unit of time.

The first transceiver provided according to the embodiments of the present application estimates the self-interference channel based on the known first pilot signal and the first pilot signal transmitted through the self-interference channel, to obtain the estimation value of the self-interference channel at the i-th instant. The first transceiver estimates the communication channel based on the known second pilot signal and the second pilot signal transmitted through the communication channel, to obtain the estimation value of the communication channel at the i-th instant. Then, the self-interference signal at the i-th instant is estimated based on the estimation value of the self-interference channel at the i-th instant and the local-end transmission signal transmitted by the first transceiver at the i-th instant. The estimation value of the received opposite-end transmission signal at the i-th instant is obtained by performing the digital interference cancellation on the received signal received by the first transceiver based on the self-interference signal. The opposite-end transmission signal at the i-th instant is estimated based on the estimation value of the received opposite-end transmission signal at the i-th instant and the estimation value of the communication channel at the i-th instant, to obtain the estimation value of the opposite-end transmission signal at the i-th instant. Finally, the estimation value of the self-interference channel at the (i+1)-th instant is obtained with the first channel estimation formula, based on the estimation value of the self-interference channel at the i-th instant, the local-end transmission signal at the i-th instant, the estimation value of the communication channel at the i-th instant and the estimation value of the opposite-end transmission signal at the i-th instant. The estimation value of the communication channel at the (i+1)-th instant is obtained with the second channel estimation formula, based on the estimation value of the communication channel at the i-th instant, the estimation value of the opposite-end transmission signal at the i-th instant, the estimation value of the self-interference channel at the i-th instant and the local-end transmission signal at the i-th instant. Compared with a case that the transceivers estimate the self-interference channel and the communication channel by frequently transmitting the pilot signals in the conventional technology, the transmission times of the pilot signal may be reduced and the utilization rate of the communication resources is improved effectively.

Those skilled in the art may clearly understand that specific operation process of the apparatuses and units described above may refer to corresponding processes of the above method embodiments for convenience and simplicity of description, which is not described herein.

It should be understood that the disclosed apparatuses and methods according to some embodiments of the present application may be implemented in other ways. For example, the apparatus embodiments described above are illustrative only. For example, the units are divided merely in logical function, which may be divided by another way in actual implementation. For example, multiple units or components may be combined or integrated into another system, or some features may be ignored or not performed. In addition, the disclosed or discussed mutual coupling or direct coupling or communication connection may be an indirect coupling or communication connection through some interfaces, devices or units, which may be implemented in electronic, mechanical or other forms.

The units described as separated components may or may not be physically separated. A component displayed as a unit may or may not be a physical unit, which may be located in one position or distributed on multiple network units. A part or all of the component may be selected to achieve the object of solutions in the embodiments of the present application based on practical requirements.

In addition, the functional units in the embodiments of the present application may be integrated into a process unit or physically separated, or two or more units may be integrated into a unit. The integrated unit described above may be implemented in hardware or in a combination of hardware and software.

Those skilled in the art may understand that all or some of the steps of the method embodiments may be may be achieved by hardware relevant to program instructing, and the program may be stored in a computer readable storage medium. The steps including the above method embodiments are executed when the program is executed. The storage medium described above is a medium for storing program codes, such as ROM, RAM, magnetic disk or optical disk.

The embodiments of the present application is disclosed above, which will not be used to limit the protection scope of the present application. Various changes and alternatives can be made by those skilled in the art without departing from the technical scope of the present application, which fall within the protection scope of the present application. Therefore, the protection scope of the present application is in accordance with the protection scope of the claims.

What is claimed is:

1. A method for channel estimation, applied to a first transceiver, comprising:
   obtaining, by a processor, an estimation value of a self-interference channel at an i-th instant and an estimation value of a communication channel at the i-th instant, wherein the i is larger than or equal to 0, wherein the first transceiver comprises a receiver and a transmitter;
   obtaining, by the processor, a local-end transmission signal at the i-th instant, wherein the local-end transmission signal at the i-th instant is received by the receiver at the i-th instant;
   obtaining, by the processor, an estimation value of an opposite-end transmission signal at the i-th instant;
   obtaining, by the processor, an estimation value of the self-interference channel at an (i+1)-th instant and an estimation value of the communication channel at the (i+1)-th instant, based on the estimation value of the self-interference channel at the i-th instant, the estimation value of the communication channel at the i-th instant, the local-end transmission signal at the i-th instant and the estimation value of the opposite-end transmission signal at the i-th instant, wherein the (i+1)-th instant differs from the i-th instant by one unit of time; and performing, by the processor, a digital interference cancellation on a signal received by the receiver at the (i+1)-th instant based on the estimation value of the self-interference channel at the (i+1)-th instant and the estimation value of the communication channel at the (i+1)-th instant, wherein the signal received by the receiver at the (i+1)-th instant comprises a local-end transmission signal received from the transmitter of the first transceiver at the (i+1)-th instant and an opposite-end transmission signal received from another transceiver at the (i+1)-th instant.

2. The method according to claim 1, wherein the obtaining an estimation value of an opposite-end transmission signal at the i-th instant comprises:
obtaining a received signal at the i-th instant;
obtaining a self-interference signal at the i-th instant based on the estimation value of the self-interference channel at the i-th instant, wherein the self-interference signal at the i-th instant is an estimation value of a local-end transmission signal received by the first transceiver at the i-th instant;
performing a digital interference cancellation on the received signal at the i-th instant based on the self-interference signal at the i-th instant, to obtain an estimation value of a received opposite-end transmission signal at the i-th instant; and
obtaining the estimation value of the opposite-end transmission signal at the i-th instant based on the estimation value of the received opposite-end transmission signal at i-th instant and the estimation value of the communication channel at the i-th instant.

3. The method according to claim 1, wherein in a case that the i is equal to 0, before obtaining the estimation value of the self-interference channel at the i-th instant and the estimation value of the communication channel at the i-th instant, the method further comprises:
receiving a first pilot signal transmitted by the first transceiver;
obtaining the estimation value of the self-interference channel at the i-th instant based on the first pilot signal;
receiving a second pilot signal transmitted by a second transceiver; and
obtaining the estimation value of the communication channel at the i-th instant based on the second pilot signal.

4. The method according to claim 1, wherein the obtaining an estimation value of the self-interference channel at an (i+1)-th instant and an estimation value of the communication channel at the (i+1)-th instant, based on the estimation value of the self-interference channel at the i-th instant, the estimation value of the communication channel at the i-th instant, the local-end transmission signal at the i-th instant and the estimation value of the opposite-end transmission signal at the i-th instant comprises:
obtaining the estimation value of the self-interference channel at the (i+1)-th instant with a first channel estimation formula, based on the estimation value of the self-interference channel at the i-th instant, the local-end transmission signal at the i-th instant, the estimation value of the communication channel at the i-th instant and the estimation value of the opposite-end transmission signal at the i-th instant; and obtaining the estimation value of the communication channel at the (i+1)-th instant with a second channel estimation formula, based on the estimation value of the communication channel at the i-th instant, the estimation value of the opposite-end transmission signal at the i-th instant, the estimation value of the self-interference channel at the i-th instant and the local-end transmission signal at the i-th instant, wherein the first channel estimation formula is $$\hat{h}_n(i+1)=\hat{h}_n(i)+\mu_n x_n(i)e^*(i),$$

the second channel estimation formula is $$\hat{h}_s(i+1)=\hat{h}_s(i)+\mu_s \hat{s}(i)e^*(i),$$

wherein the $\mu_n$ is a step parameter of the first channel estimation formula, the $\mu_s$ is a step parameter of the second channel estimation formula, the $e^*(i)$ is a conjugate transpose of a difference $e(i)$ between the received signal and a sum of the self-interference signal at the i-th instant and the estimation value of the received opposite-end transmission signal at the i-th instant, the $x_n(i)$ is the local-end transmission signal at the i-th instant, the $\hat{s}(i)$ is the estimation value of the opposite-end transmission signal at the i-th instant, the $\hat{h}_n(i)$ is the estimation value of the self-interference channel at the i-th instant, the $\hat{h}_s(i)$ is the estimation value of the communication channel at the i-th instant, the $\hat{h}_n(i+1)$ is the estimation value of the self-interference channel at the (i+1)-th instant, and the $\hat{h}_s(i+1)$ is the estimation value of the communication channel at the (i+1)-th instant.

5. A transceiver, comprising: a receiver, a transmitter and a processor configured to:
obtain an estimation value of a self-interference channel at an i-th instant and an estimation value of a communication channel at the i-th instant, wherein the i is larger than or equal to 0;
obtain a local-end transmission signal at the i-th instant, wherein the local-end transmission signal at the i-th instant is received by the receiver at the i-th instant;
obtain an estimation value of an opposite-end transmission signal at the i-th instant;
obtain an estimation value of the self-interference channel at an (i+1)-th instant and an estimation value of the communication channel at the (i+1)-th instant, based on the estimation value of the self-interference channel at the i-th instant, the estimation value of the communication channel at the i-th instant, the local-end transmission signal at the i-th instant and the estimation value of the opposite-end transmission signal at the i-th instant, wherein the (i+1)-th instant differs from the i-th instant by one unit of time; and
perform a digital interference cancellation on a signal received by the receiver at the (i+1)-th instant based on the estimation value of the self-interference channel at the (i+1)-th instant and the estimation value of the communication channel at the (i+1)-th instant, wherein the signal received by the receiver at the (i+1)-th instant comprises a local-end transmission signal received from the transmitter of the first transceiver at the (i+1)-th instant and an opposite-end transmission signal received from another transceiver at the (i+1)-th instant.

6. The transceiver according to claim 5, wherein the processor is configured to:

obtain a received signal at the i-th instant;

obtain a self-interference signal at the i-th instant based on the estimation value of the self-interference channel at the i-th instant, wherein the self-interference signal at the i-th instant is an estimation value of a local-end transmission signal received by the transceiver at the i-th instant;

perform a digital interference cancellation on the received signal at the i-th instant based on the self-interference signal at the i-th instant to obtain an estimation value of a received opposite-end transmission signal at the i-th instant; and obtain the estimation value of the opposite-end transmission signal at the i-th instant based on the estimation value of the received opposite-end transmission signal at the i-th instant and the estimation value of the communication channel at the i-th instant.

7. The transceiver according to claim 5, wherein the receiver is configured to, in a case that the i is equal to 0, receive a first pilot signal transmitted by the transceiver, the processor is further configured to obtain the estimation value of the self-interference channel at the i-th instant based on the first pilot signal;

the receiver is further configured to in the case that the i is equal to 0, receive a second pilot signal transmitted by the transceiver; and the processor is further configured to obtain the estimation value of the communication channel at the i-th instant based on the second pilot signal.

8. The transceiver according to claim 5, wherein the processor is configured to:

obtain the estimation value of the self-interference channel at the (i+1)-th instant with a first channel estimation formula, based on the estimation value of the self-interference channel at the i-th instant, the local-end transmission signal at the i-th instant, the estimation value of the communication channel at the i-th instant and the estimation value of the opposite-end transmission signal at the i-th instant; and obtain the estimation value of the communication channel at the (i+1)-th instant with a second channel estimation formula, based on the estimation value of the communication channel at the i-th instant, the estimation value of the opposite-end transmission signal at the i-th instant, the estimation value of the self-interference channel at the i-th instant and the local-end transmission signal at the i-th instant, wherein the first channel estimation formula is $$\hat{h}_n(i+1)=\hat{h}_n(i)+\mu_n x_n(i)e^*(i),$$

the second channel estimation formula is $$\hat{h}_s(i+1)=\hat{h}_s(i)+\mu_s \hat{s}(i)e^*(i),$$

wherein the $\mu_n$ is a step parameter of the first channel estimation formula, the $\mu_s$ is a step parameter of the second channel estimation formula, the $e^*(i)$ is a conjugate transpose of a difference $e(i)$ between the received signal and a sum of the self-interference signal at the i-th instant and the estimation value of the received opposite-end transmission signal at the i-th instant, the $x_n(i)$ is the local-end transmission signal at the i-th instant, the $\hat{s}(i)$ is the estimation value of the opposite-end transmission signal at the i-th instant, the $\hat{h}_n(i)$ is the estimation value of the self-interference channel at the i-th instant, the $\hat{h}_s(i)$ is the estimation value of the communication channel at the i-th instant, the $\hat{h}_n(i+1)$ is the estimation value of the self-interference channel at the (i+1)-th instant, and the $\hat{h}_s(i+1)$ is the estimation value of the communication channel at the (i+1)-th instant.

* * * * *